United States Patent [19]

Taylor et al.

[11] 4,437,121

[45] Mar. 13, 1984

[54] VIDEO PICTURE PROCESSING APPARATUS AND METHOD

[75] Inventors: Richard J. Taylor, London; Paul R. N. Kellar, Newbury; Neil R. Hinson, Petersfield, all of England

[73] Assignee: Micro Consultants Limited, Berkshire, England

[21] Appl. No.: 499,676

[22] Filed: Jun. 6, 1983

Related U.S. Application Data

[63] Continuation of Ser. No. 246,970, Mar. 24, 1981, abandoned.

[30] Foreign Application Priority Data

Apr. 10, 1980 [GB] United Kingdom ................ 8011834

[51] Int. Cl.³ .............................................. H04N 5/22
[52] U.S. Cl. .................................... 358/160; 358/185; 382/46; 340/727; 364/514
[58] Field of Search ............................... 358/180–185, 358/22, 160, 140, 335, 138; 340/727, 728, 729, 744; 364/515, 521, 522; 343/6 TV, 5 DP, 5 SC; 382/41, 45, 46

[56] References Cited

U.S. PATENT DOCUMENTS

| | | | |
|---|---|---|---|
| 4,026,555 | 5/1977 | Kirschner et al. | 364/521 X |
| 4,168,488 | 9/1979 | Evans | 340/744 X |
| 4,225,929 | 9/1980 | Ikeda | 364/521 |
| 4,271,476 | 6/1981 | Lotspiech | 340/727 X |
| 4,275,415 | 6/1981 | Engle | 343/6 TV |
| 4,286,291 | 8/1981 | Taylor et al. | 358/138 |
| 4,302,776 | 11/1981 | Taylor et al. | 358/160 |

FOREIGN PATENT DOCUMENTS

1490738 10/1974 United Kingdom .
1547119 12/1977 United Kingdom .

*Primary Examiner*—Robert L. Richardson
*Attorney, Agent, or Firm*—Dowell & Dowell

[57] ABSTRACT

A processing system for effecting angular displacement of at least part of a television picture. The picture is subdivided into picture areas each containing a plurality of picture points and a number of storage devices respectively receive information on each picture point within the area at a designated storage location. On read out, the location of a particular area is accessed by means of a picture point and line counter in a single read operation. Information on particular picture points within the area is selectively made available for interpolation via latches to allow construction of the displaced picture. The area accessed for read out can be modified relative to writing into the store in order to cope with any selected degree of displacement.

23 Claims, 18 Drawing Figures

$$N_A = (1-{}^2/_8) \times (1-{}^3/_8) = {}^{30}/_{64}$$
$$N_B = {}^2/_8 \times (1-{}^3/_8) = {}^{10}/_{64}$$
$$N_C = (1-{}^2/_8) \times {}^3/_8 = {}^{18}/_{64}$$
$$N_D = {}^2/_8 \times {}^3/_8 = {}^6/_{64}$$

$\Sigma = {}^{64}/_{64}$

Fig. 14.

| | |
|---|---|
| FULL STORE X ADDRESS (E) | $16\frac{3}{8}$ |
| FULL STORE Y ADDRESS (F) | $13\frac{5}{8}$ |
| PATCH X ADDRESS (G) | 2 |
| X ADDRESS WITHIN PATCH (H) | 4 |
| X FRACTION (I) | $\frac{3}{8}$ |
| PATCH Y ADDRESS (J) | 3 |
| Y ADDRESS WITHIN PATCH (K) | 1 |
| Y FRACTION (L) | $\frac{5}{8}$ |
| INTERPOLATION VALUE (M) | $\frac{3}{8}$ |
| INTERPOLATION VALUE (N) | $\frac{5}{8}$ |
| INTERPOLATION VALUE (P) | $\frac{5}{8}$ |
| INTERPOLATION VALUE (Q) | $\frac{3}{8}$ |
| DRIVER COLUMN N (R) | 4 |
| DRIVER COLUMN N+1 (S) | 5 |
| DRIVER ROW N (T) | 1 |
| DRIVER ROW N+1 (U) | 2 |

VIDEO PICTURE PROCESSING APPARATUS AND METHOD

This application is a continuation of application Ser. No. 246,970, filed Mar. 24, 1981, and now abandoned.

BACKGROUND TO THE INVENTION

The invention relates to the manipulation of television pictures to effect angular displacement resulting at least in partial rotation of the picture.

STATEMENT OF PRIOR ART

In the known picture manipulation systems e.g. Quantel DPE 5000 series of equipments, a range of facilities and effects are available that are able to emulate the action of a lens entirely by electronic means. Pictures can be enlarged, compressed, moved, changed in shape and even frozen, far removed from the original camera and lens system. The demands for such equipment come from both the creative and engineering staff of television since these facilities allow a degree of creativity and flexibility that previously has, at best, been time consuming or not attainable with existing equipment.

An effect that has so far not been available has been the ability to rotate an image in the plane of the T.V. screen in an adequate manner. The applications of this facility would range from the special effect to the simple lining up of material shot at an odd angle during the original take.

For a simple change in linear dimension new picture points must be generated from the existing points in such a way that not only are they derived from the appropriate part of the original image but that the necessary interpolation is obtained. Put simply, if a picture is to be shrunk to half size, every other picture point and every other line could be skipped during read out from a framestore and the result would indeed be a half size image. The flaw in this approach is that quality would be poor since the skipped points and lines have made no contribution to the final picture causing a certain raggedness. However, a still more important consideration is that this simple approach will only work for $\frac{1}{2}$, $\frac{1}{4}$, $\frac{1}{8}$, 1/16 size pictures. The problem becomes more interesting when non-binary changes of size are required. A ratio of 0.9:1 for example cannot be achieved by merely skipping one picture point and one line in ten but, as can be seen from FIG. 1 the new information must be interpolated from adjacent input points. A full description of the manner in which interpolation is possible is given in U.S. Pat. No. 4,163,249 for example.

A brief consideration of FIG. 1 reveals that, difficult as the above interpolation process is to realise in real time, it is much simplified by the fact that the output raster is in the same orientation as the input i.e. a whole line of output information is obtained from two whole lines of input information.

Consider now the situation for the case of the picture rotation. FIG. 2 shows two rasters rotated with respect to one another by approximately 30 degrees. The horizontal raster could be regarded as the input to a framestore and the rotated version the output. It will be seen that, in this case, horizontal information on the output (remember this is information parallel to the rotated raster) clearly is influenced by different lines of input for its whole length. This simple fact causes problems for the designer of the framestore architecture seeking to implement rotation in real time and is further compounded when interpolation is required to obtain suitable quality of result.

Bulk semiconductor storage media (e.g. Dynamic RAM chips) are slower than the required data rate for real time frame storage of video and so, traditionally, incoming information is demultiplexed before entry into the store and then remultiplexed after read out of several points in parallel.

It is usual to read out, in the non-rotated case, two lines in parallel deriving all the output points required from these same two lines when interpolating. This is clearly impossible in the rotated case as information is required from more than two lines for picture synthesis for the angled (rotated) line now required.

The problem is to determine whether there is a way of demultiplexing the store to make use of existing high capacity, low power and low cost storage elements that are relatively slow (i.e. which operate at an accessing rate substantially less than picture point rate). U.S. Pat. No. 4,183,058 for example shows a typical demultiplexing system for a conventional framestore and its basic store configuration is now shown in FIG. 3. In this case groups of 16 picture points are written into or read out from the store at the same time. These 16 points are adjacent along the line of video being considered and can comprise for example the 16 picture points referenced in FIG. 1. Thus each 8 bit word for picture points 1 to 16 is latched into a respective one of the input latches 10$a$–10$p$. After the occurrance of 16 picture points, each latch now holds data on 1 picture point and a single write cycle of RAMs 11$a$–11$p$ will simultaneously enter the respective data for all 16 picture points, utilizing the capability of the RAMs to operate at 1/16 video rate. For read out the data for each RAM is received by respective output latches 12$a'$–12$p$ and thus read out from the RAMs is at 1/16 video rate, while the data is available from the latches at normal video rate. Although each RAM 11$a$ etc is shown simplified as a single block, in practice this block would typically comprise two sets of 8 chips each chip in the set being used to receive 1 bit of the 8 bit word from the input latches and each set being switched at field rate so that one set holds field A whilst the other holds field B. At read out the single bits are read out to provide that 8 bit word to the output latches.

For the reasons stated above this system as it is described is unsuitable where output information would be derived from different input lines for the length of the output line as is required for rotation of the picture and this information is not available quickly enough with such a store demultiplexing configuration.

BRIEF DESCRIPTION OF THE DRAWINGS

The invention will now be described by way of example with reference to the accompanying drawings, in which:

FIG. 14 shows a chart of typical processing results using the system of FIG. 13 above.

DESCRIPTION OF PREFERRED EMBODIMENTS

Figure 1:
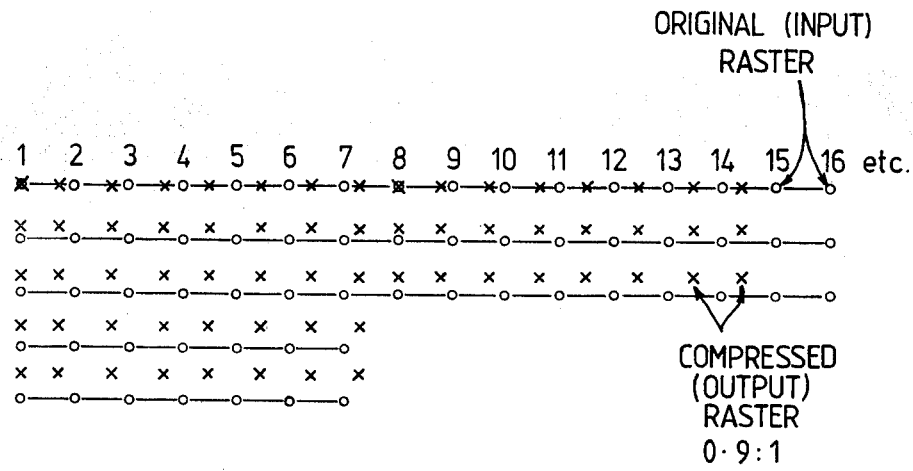
FIG. 1 shows a representation of the manipulation of the input raster to provide a compressed picture.
Figure 2:
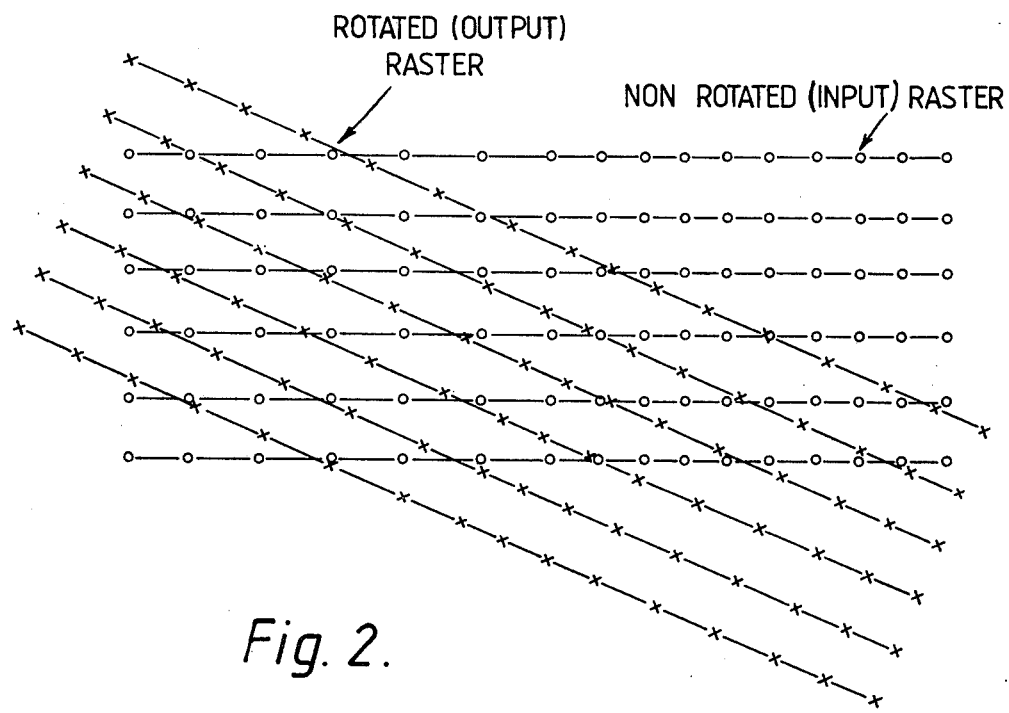
FIG. 2 shows the manipulation requirements for picture rotation.
Figure 3:
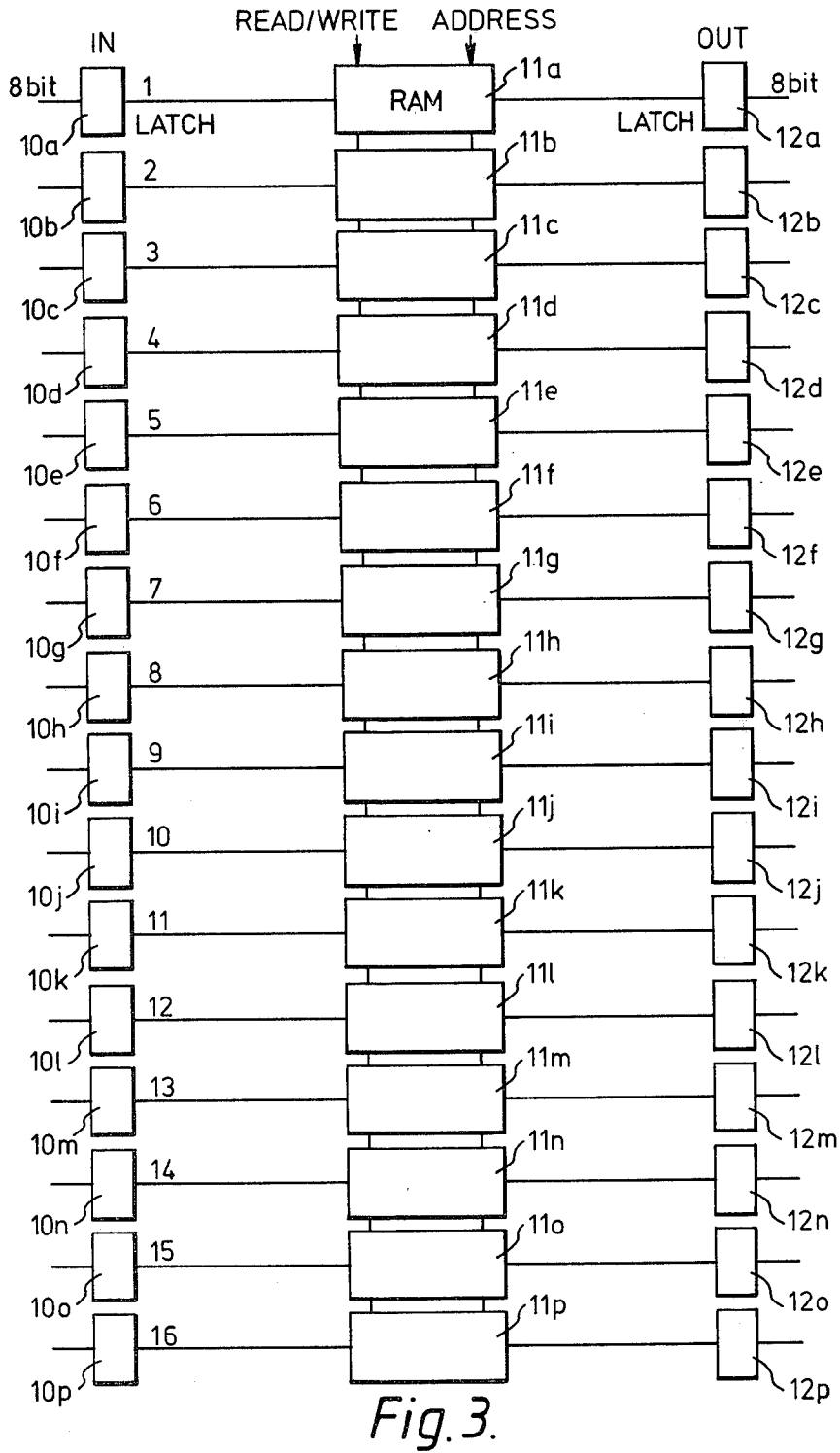
FIG. 3 shows a known frame store configuration capable of handling sequential picture points.
Figure 4:
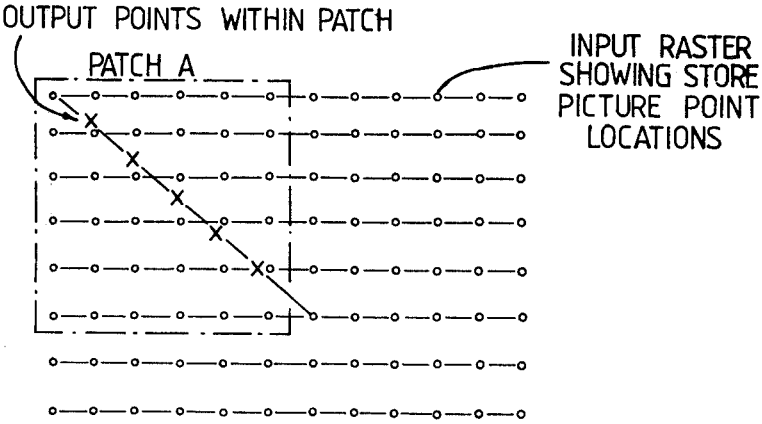
FIG. 4 shows demultiplexing picture points in a configuration of the present invention to provide access to a picture point patch.

The simple linear demultiplexer described in FIG. 3 is now replaced in the present invention by what we shall call a "patch demultiplexer". FIG. 4 shows such a concept. Supposing the store were to be organised such that two dimensional patches of information were available—say 6 picture points wide by 6 lines tall as shown encompassed by the broken lines. Five points of information can be easily derived along a vertical or horizontal line or a line in any direction from such a patch. It will be clear that, using this technique, a five to one demultiplex has been achieved as all picture points within this matrix of 6×6 can be read out in one cycle of the store and interpolated in turn to derive the 5 new picture points for the rotational effect. Of course, 36 points have had to be made available to achieve the five level demultiplex but nevertheless this technique has made it possible to use slow RAM in the rotator framestore.

Figure 5:
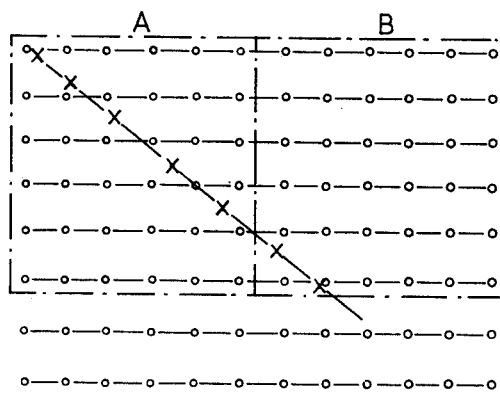
FIG. 5 shows a situation requiring modification of the relative patch locations.

The technique has been shown to work for the example in FIG. 4 but we have found that this is a special case with the rotated line being generated starting in the top left hand corner of the patch. FIG. 5 shows that if a straight-forward view is taken of splitting up the store into patches then the idea encounters difficulties since in Patch B of the figure a demultiplex of only two is achieved, as only two picture points can be synthesised from the 36 available from patch B.

Figure 6:
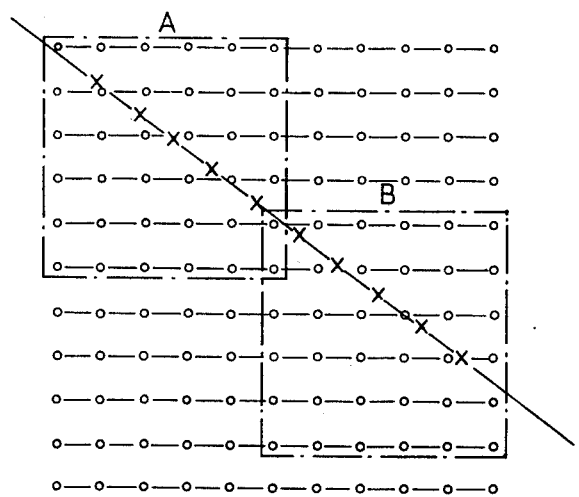
FIG. 6 shows an example of suitable modification of one of the demultiplex patches.

If then the principle is to work in all circumstances, we have found that the placing of the "patches" in the store must be modified as shown in the example of FIG. 6 with each new patch starting such that a corner sits on the line to be generated. The position of a corner will of course be dependent on the degree of rotation selected and thus the slope of the line to be synthesised. This has the result that it must be possible to define the origin of the patch to an accuracy of one picture point in the original raster in spite of the fact that 36 picture points are made available at once and that the patch need only be 'moved' every five output points generated.

In other words the patch is somewhat like a window which can be moveable to encompass the 36 picture points required for the picture synthesis, the requirement being variable, dependent on the degree of rotation.

Before moving on to describe a typical realisation of the patch demultiplexer one other subtle but important aspect of the rotator must be covered. At first sight it would appear that the patch must be square since when a picture is rotated at 90° lines move down the patch and therefore, six elements must be available to give the 5:1 demultiplex.

However, if each field is treated separately, and since each field only contains every other line of the complete image, it is only necessary to have a patch of 4 lines by 6 picture points in order to be able to create 5 picture points in any direction. This saving however cannot be made if interpolation is carried out between fields.

If the picture points in the image are on a grid which has different horizontal and vertical scaling, this can be accommodated by changing the shape of the "patch" or by altering the demultiplex ratio to create, say, only 4 output picture points from each 6×4 patch.

A further problem is how to realise a system that allows access to the patch of 6×4 points in such a manner that the origin can be located to the accuracy of a single picture point. However, for ease of understanding the store mechanism will first be described neglecting the requirement for accuracy of the origin, so as to illustrate the basic system operation of the invention initially.

Figure 7:
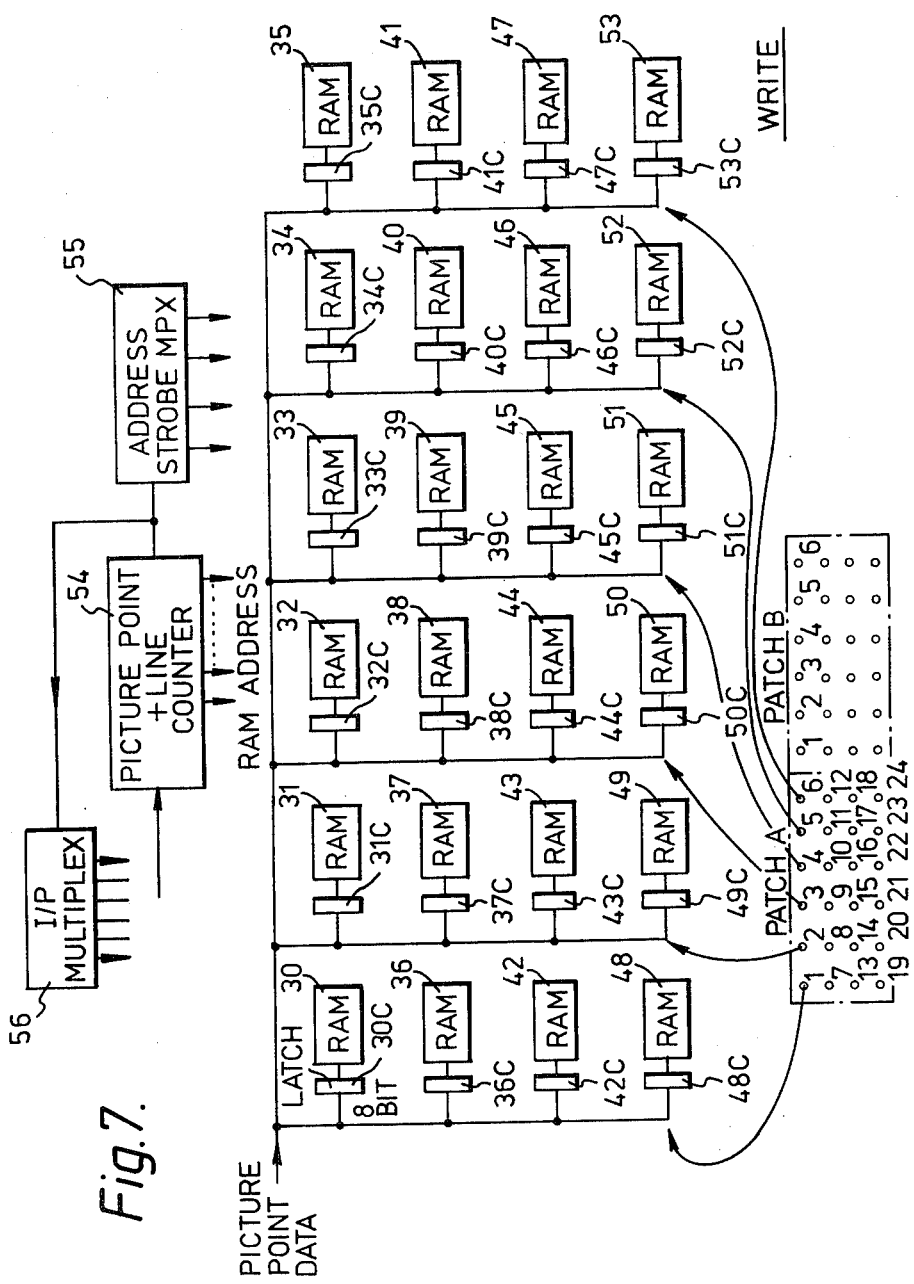
FIG. 7 illustrates an embodiment of the store configuration of the present invention dealing with the write side of the system.

FIG. 7 shows an embodiment of the store configuration of the present invention which includes a matrix of RAM stores 30-52, arranged for ease of understanding in rows and columns corresponding to one of the patches of 24 picture points already described. This figure shows the write side of the store system only (i.e. the mechanism for outputting data is not shown here for the sake of clarity). Incoming picture point data is received by the various input latches 30c–53c which each receives data on a respective particular picture point as an 8 bit word. The latches are expediently provided with dual locations to allow one picture point to be available for write in to the RAM whilst receiving another picture point at its second location in a similar manner to that disclosed in U.S. Pat. No. 4,183,058. The picture point and line counter 54 is in practice used to address the same location in all the RAMs simultaneously but for clarity the connection therebetween has been omitted (the addressing forms a common connection to the RAMs). It is clear from the description how this and the multiplexers 55 and 56 are connected.

Expediently the picture points can be available to all latches and by using the normal picture point and line counter 54 with an input multiplexer 56, only 1 column (30c, 36c, 42c, 48c for picture point no. 1) will actually capture the data in dependence on the enable signal provided for multiplexer 56 (1 of 6 mulitplex). Thus one of the six outputs from multiplexer 56 is connected to all latches in that column. Although the same picture point is available to RAMs 30, 36, 42 and 48 it is only written into RAM 30 due to the presence of address strobe multiplexer 55 having one of its four outputs connected to all RAMs in that row, which multiplexer will therefore provide a strobe signal only to one of the four RAMs in the row during a write cycle (1 of 4 multiplex). If RAM block 30 (and the other blocks) is of 16K storage capacity then up to 16,000 patches can be handled by the entire store. Looking at patch A for example, points 1 to 6 are latched respectively as they occur into each of the six latches of the first row, the second location in each latch then being available to receive the points 1 to 6 of patch B. Whilst these second series of 6 points are being handled a write cycle of the RAMs is effected for (say) the first address location within each of the RAMs 30–53, the address for writing this data into being provided by the counter 54. However, because of the presence of address strobe multiplexer 55 only one of the four rows (in this case RAMs 30–35) receives a strobe so that only the 'top' RAMs receive respectively picture points 1 to 6 of patch A. It is clear that only 1 write cycle of the RAMs is required every 6 picture points received thus the store cycle is operating at 1/6th data rate which is slow enough to be handled by these dynamic RAM chips. The picture points 1 to 6 of patch B will eventually go into the second address location within RAMs 30–35 respectively and so on until all picture points along the first video line are stored (up to 128 write cycles). At the next line received (i.e. point 7 of patch A), the procedure is similar, that is points 7 to 12 are latched in sequence in the six columns and then during a write cycle of the RAMs, the address multiplexer 55 will allow only strobing of RAMs 36–41, so that each of these picture points goes into the first address location of these RAMs. The operations continue until all picture points of all patches are entered.

Thus such an operation will handle a patch of 24 picture points. On read out these picture points can be used for synthesising the required picture points in that part of the rotated line. (Modification of the number of rows and columns could be made in other embodiments if demultiplexing ratio needed to be changed).

The read side of the store configuration will now be considered.

Figure 8:
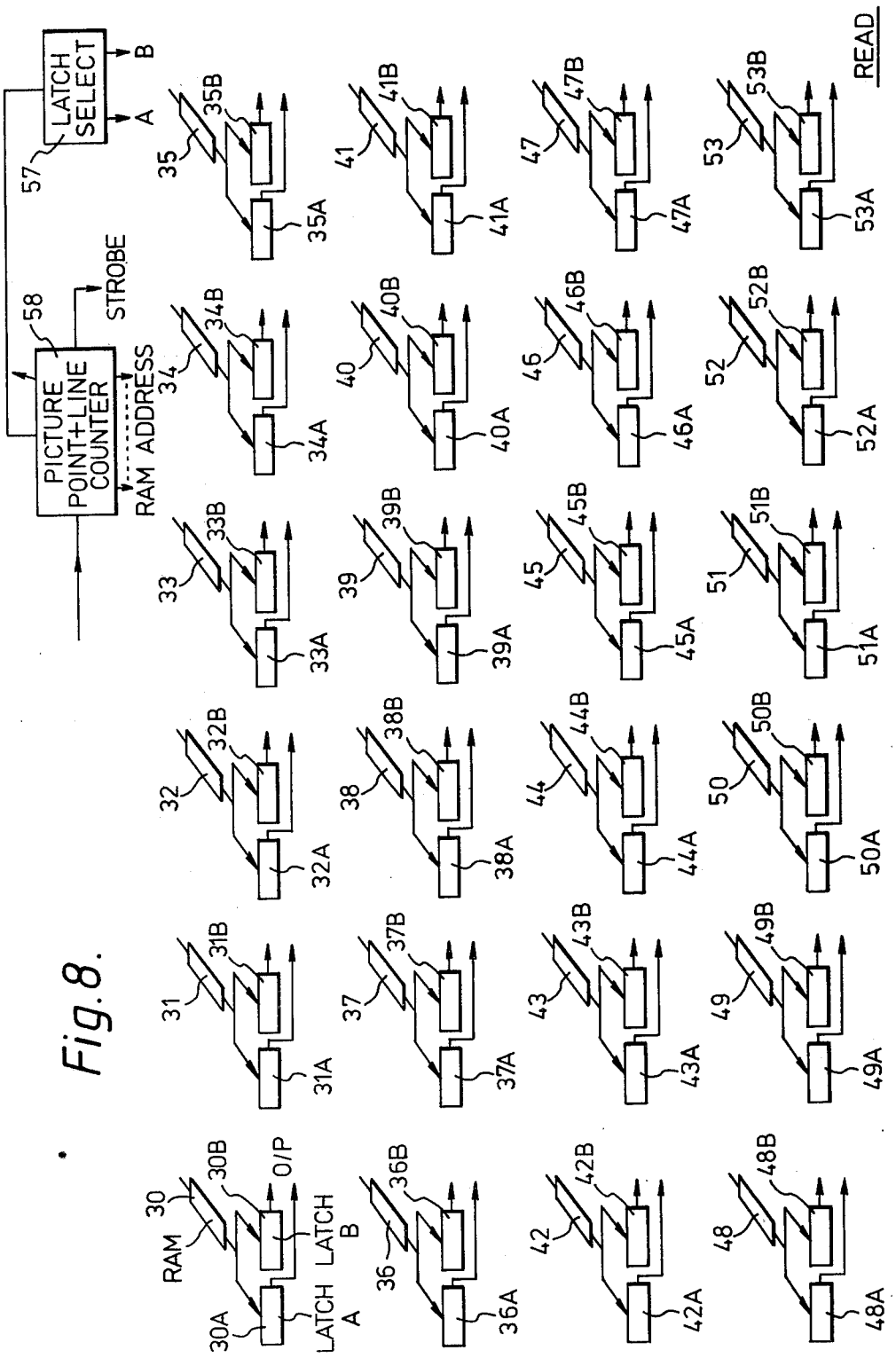
FIG. 8 shows a corresponding configuration checking with the read side of the system.

Consider FIG. 8 that shows the matrix of RAM with a series of latches on the output. For clarity input data latching and addressing mechanisms have been omitted from this Figure. The RAMs 30–53 are shown with two output latches 30A–53A and 30B to 53B respectively. The basic operation with a single read cycle is that all 24 RAMs in the matrix are addressed in dependence on the output of picture point and line counter 56 giving the desired address location which output is common to all the RAMs. In the read situation all RAMs are strobed and so an address strobe multiplexer similar to block 55 of FIG. 7 is not required. Thus all picture points within that patch are read out from the RAMs into their respective latches (say latch A) in one read cycle. Thus addressing the first location in each RAM will output the picture points 1 to 24 for patch A of FIG. 7 into the latches 30A–53A.

Incrementing the addressing for the next read cycle will output the 24 picture points from patch B of FIG. 7 and these can be held in latch B (i.e. latches 30B–53B respectively).

A latch enabling multiplexer block 57 for example can be provided with a pair of outputs respectively for all latches A or B to select which latches are to be utilised at any one time. It will be clear therefore that the arrangement as shown is capable of producing 24 points for one address cycle of the store since one store cycle loads all of one set of output latches in parallel then leaving them to be examined at will by high speed read circuitry described later. While the first set are being read the second set are being loaded from the RAM store.

By arranging the store in such a configuration this technique can produce 24 points for one store cycle which are related to the 6×4 patch in the image plane. Each single RAM chip 30–53 attached to each of the 24 output latch locations is sufficient to store the image (using either 8K or 16K RAM), and this allows the address arrangements to be organised such that the top row of RAM as drawn holds data from lines 1, 5, 9, 13 etc., the second from 2, 6, 10, 14 the third 3, 7, 11, 15 and the fourth 4, 8, 12, 16 etc. In other words, the physical drawing as shown truely can represent the patch of 6 picture points by 4 lines read out from the store. Thus considering a T.V. field to comprise approximately 250 lines each with 500 picture points thereon, then in the case of patches comprising 24 picture points, nearly 8000 such patches will be required to cover the entire picture area of that field. Hence an 8K memory will handle one field and 16K an entire frame (i.e. two fields).

Figure 9:
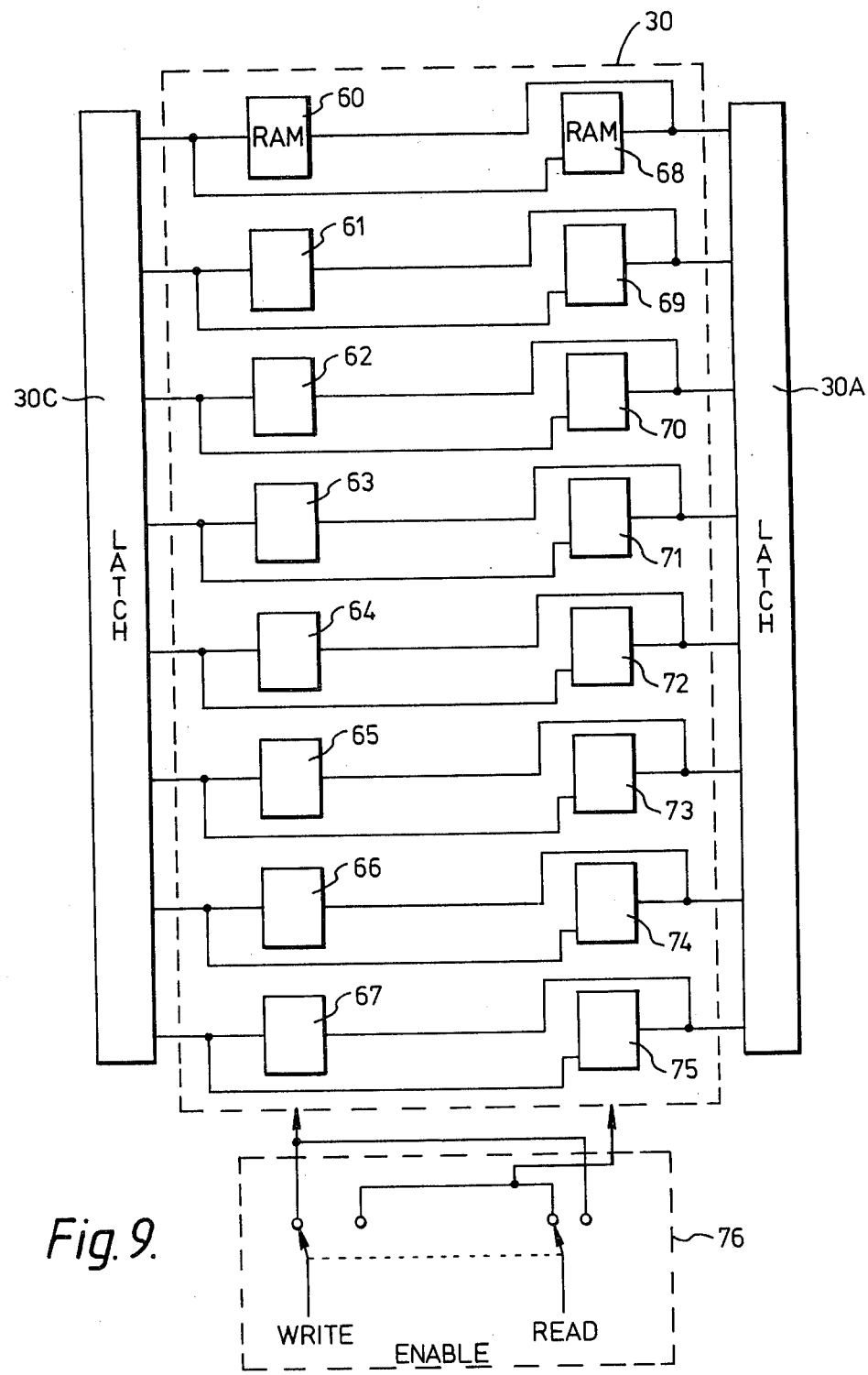
FIG. 9 shows the internal construction of a RAM store block capable of handling 8 bit picture points from two fields.

In practice, although the RAMs 30 etc of FIGS. 7 and 8 are shown as single blocks in reality each will comprise a number of individual RAM chips, an example being shown in FIG. 9. Thus RAM block 30 comprises a first seyt of chips 60–67 and a second set of chips 68–75. Each chip can handle 1 bit of the 8 bit word for a particular picture point received from latch 30c to a total of 8K. The chip outputs are received by latch 30A (or 30B) and on read out again form the 8 bit word for that stored picture point. The two sets are respectively concerned with handling data from one of the two fields of the frame. To control which set handles the data, a switch 76 is shown which is ganged so as to allow one set to be operated in the read mode whilst the other set is operating in the write mode and vice versa. Although mechanical switching is shown for simplicity this would normally be controlled electronically to switch at field rate in known manner.

This allows field B to be written into one set whilst the other set is available for read out of field A. Adopting such a system avoids any requirement for the inclusion of a "cross-over" mechanism for the store when "write before read" changes to "read before write". As explained in U.S. Pat. No. 4,183,058 this sudden change in delay through the machine of one frame would otherwise result in picture splitting when the subject on the screen moves at cross over. For the rotator the point of cross over is changing throughout the store and accordingly, in the example of the rotator being discussed, the difficulty of fabricating a suitable mechanism is avoided by having two groups of RAM attached to the sets of output latches—one group is being written into whilst the other is being read from. At the end of the field the two then change state as just described under the control of switch 76. Thus a conflict between write and read for a particular field is avoided.

The 24 picture points avialable for interpolation at any time in a particular patch following read out therefore comprise 6 picture points from 4 (sequential) lines in the same field. Although normally these are two interlaced fields in the frame, in this arrangement to prevent conflict it is not possible to look at the lines from both fields together for interpolation and dependent on the position of a synthesised picture point relative to the normal line position some vertical resolution in the synthesised picture may be lost although horizontal resolution is unchanged. In practice this is not noticeable to the eye when dealing with rotational effects.

Figure 10:
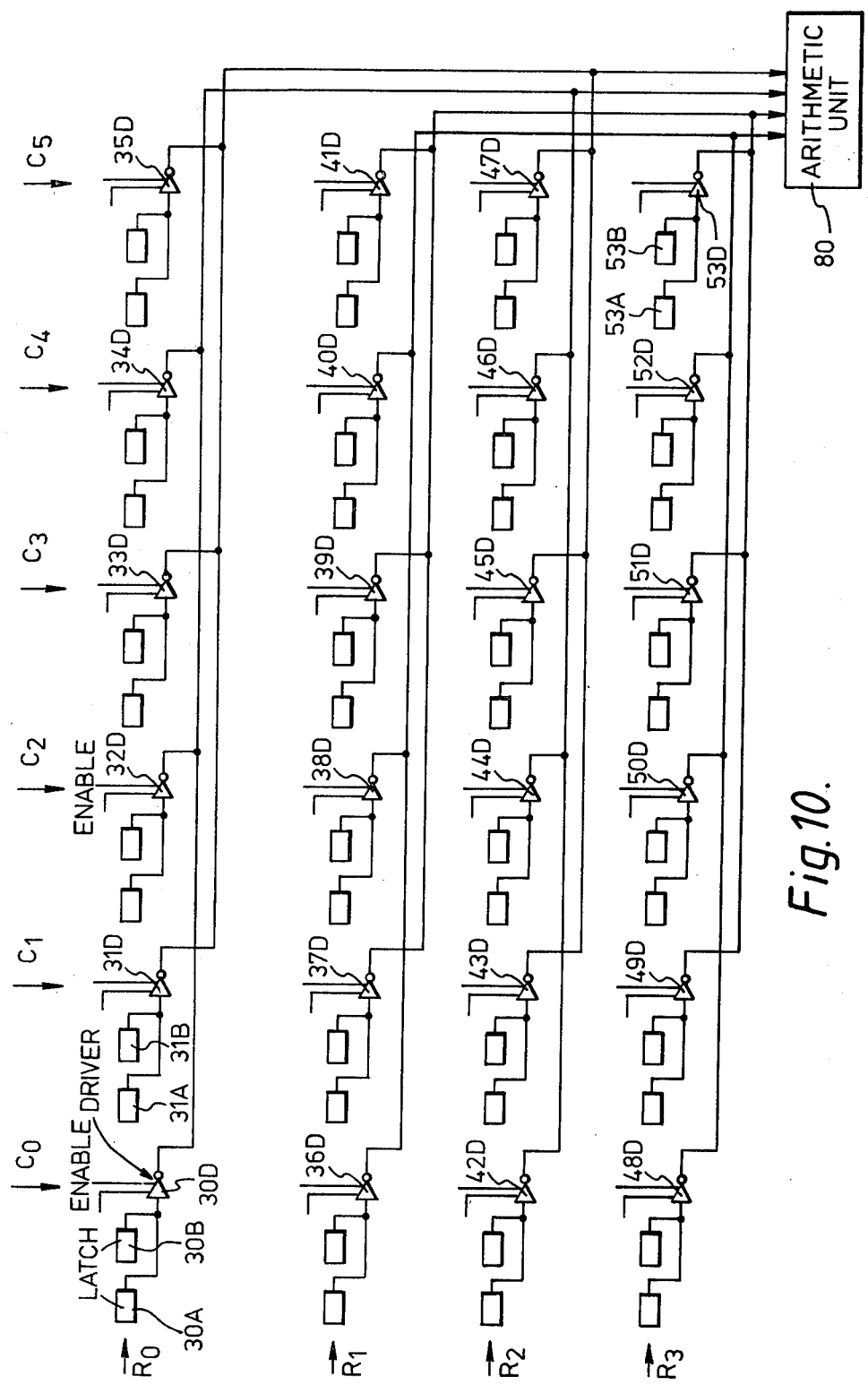
FIG. 10 shows the selector mechanism for choosing 4 picture points from the available 24.
Figure 11:
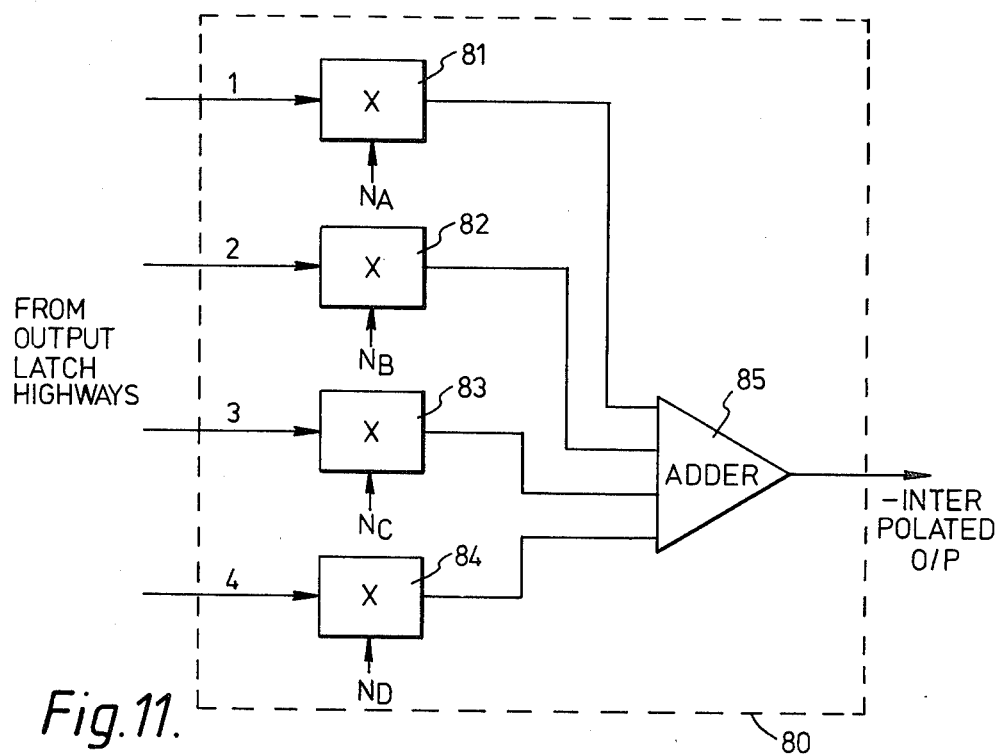
FIG. 11 shows the arithmetic unit for interpolation.

Returning to FIG. 8, for interpolation between any 4 points within the patch to generate the new picture point, it is necessary to select the desired 4 latches at any one time from the possible 24. A suitable arrangement for achieving this is shown in FIG. 10. The output latches 30A, 30B-53A, 53B of FIG. 8 are shown connected to a tristate driver 30D-53D. The outputs from the drivers are broken down into 4 highways. The connection of the drivers in the manner shown ensures that any 4 adjacent picture points can be made available together and thus the 4 highways can provide the 4 picture points required for interpolation. One of each pair of latches 30A or 30B etc is in a read state so that data can be made available from any such latch so that any picture point within the patch can be output to the highway in dependence on the enabling of the respective drivers. As already explained the four picture points used for interpolation will be required to change 5 times to generate the new picture points within the patch, thus 5 such enabling operations are carried out following each read cycle of the store. To control which picture points are placed on the highway, the enabling is expediently organised by defining the coordinates of the driver location and the six columns are now called by way of explanation $C_0$ to $C_5$ and the four rows $R_0$ to $R_3$. By providing two enables (row and column) it is possible to select any desired driver. A driver will only produce the output when both a row and column enable are received. Thus by providing $C_0$, $R_0$ driver 30D is enabled; $C_1$, $R_0$ enables 31D; $C_0$, $R_1$ enables 36D and $C_1$, $R_1$ enables 37D. Thus a first picture point (see FIG. 7) used for the rotational synthesis can be calculated from original picture points 1, 2, 7 and 8 from patch A. The interpolation is effected in arithmetic unit 80. An embodiment of the arithmetic unit is shown in more detail in FIG. 11.

The four picture points for the interpolation are received at the input of the respective multipliers 81-84 where the particular picture point is multiplied by a coefficient $N_A$ to $N_D$. The result is added in adder 85. The sum of $N_A$, $N_B$, $N_C$ and $N_D$ will normally be unity. The values of $N_A$ through $N_D$ are selected in dependence on the position of the new picture point synthesised for the rotation relative to that occupied by the original picture points.

Figure 12:
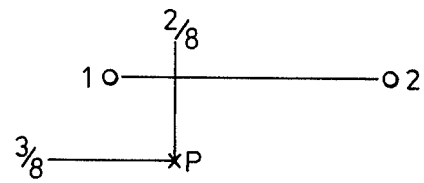
FIG. 12 shows an example of the computation of coefficients for a particular synthesis step.

A specific example is illustrated in FIG. 12 in which the 4 original picture points are shown as 1, 2, 7 and 8 (following the example selected in FIG. 10) and these are used to synthesise picture point P which we will deem to be required in the relative position shown, viz 2/8 of the way between 1 and 2 and 3/8 of the way between 1 and 7. We will take it that the coefficients available for use by the multipliers range from 0/64 to 64/64. The nearer the new picture point is to an existing picture point the greater the percentage of the existing picture point is used for interpolation.

Thus from the chart of FIG. 12:

$N_A = 30/64$ $N_B = 10/64$ $N_C = 18/64$ $N_D = 6/64$ the summation of which gives unity.

Figure 13:
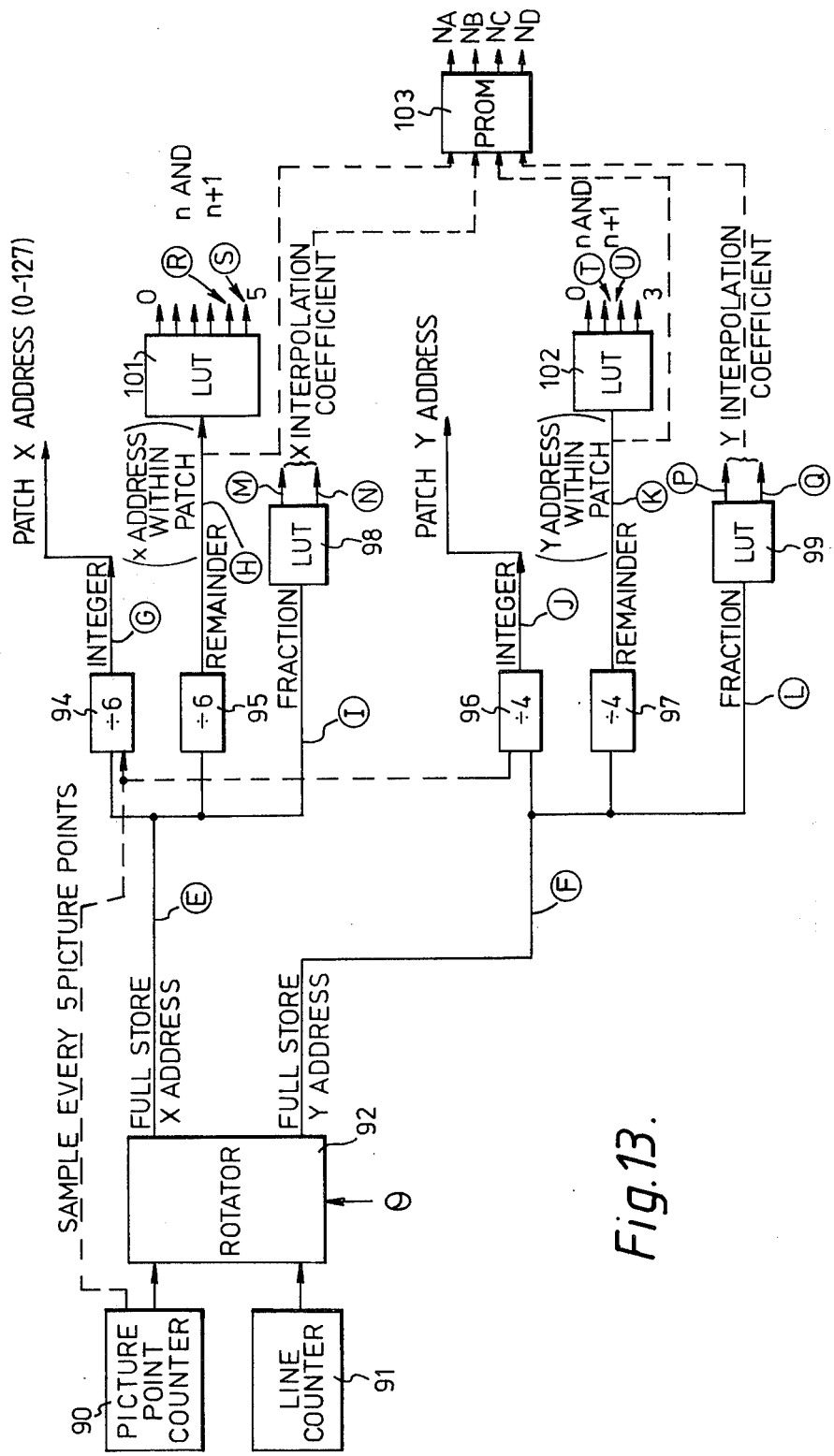
FIG. 13 shows an embodiment of the system capable of determining the picture points and coefficients required for synthesis dependent of the rotational angle selected

The values of the coefficients chosen in practice are determined in dependence on the degree of rotation selected and a mechanism for providing the coefficients is shown in FIG. 13.

The rotation is achieved on the read side of the store as already explained. Modification of the read addressing is required compared to the write operation in order to select the desired patch at any particular time. Thus picture point counter 90 and line counter 91 which will be counting the picture points and the lines as normal for a frame read out, and these counts are received by rotator block 92 which produces a modification of the addressing in dependence on the angle $\theta$ for rotation selected. The rotator block transforms the addressing according to the relatively straightforward law $PR = P \cos \theta - L \sin \theta$ and $LR = P \sin \theta + L \cos \theta$ where P is the original picture point address and PR is the rotated picture point address and where L is the original line address and LR is the rotated line address.

The transformed picture point count is provided as an x address and the transformed line address is provided as the y address relative to the full store. This will be provided from rotator 92 to an accuracy of ⅛ for reasons as illustrated in FIG. 12 and thus this gives the actual location of the picture point to be synthesised. This calculation will be continuously updated at picture point rate as picture point counter 90 is incremented.

As the picture has been broken down into patches and as already explained data cannot be read out from the RAMs at normal data rate, then it is necessary to include additional circuit elements to provide the necessary addressing capabilities. The number of patches for the frame can be considered to total up to 128×128.

The full store x address is received by divide by six counter 94 which provides the patch x address (0–127), remembering that there are 6 picture points horizontally in the patch.

The full store y address is received by divide by four counter 96 which provides the patch y address (0–127), remembering that the patch comprises picture points taken from 4 lines. Thus the location of the designated patch has been calculated and the data from these 24 picture points read out from the RAMs into the output latches (see FIGS. 8 and 10). As already explained above the patch will be used to synthesise 5 picture points before another patch is required and thus dividers 94 and 96 need only be sampled every 5 picture points as no change in whole patch addressing will occur during this interval. To select the 4 picture points for interpolation for each of the 5 picture points synthesised, additional dividers 95 and 97 are provided. Divide by six divider 95 is used to provide the remainder from the full store x address (i.e. divider 94 provides the integer). This remainder (0–5) effectively defines the x address within the patch and this is passed to look up table 101 which is provided with 6 output lines corresponding to the column enables $C_0$–$C_5$ of FIG. 10. The table is arranged to enable not only the driver column designed by the remainder ($C_n$) but also the next driver column in the patch ($C_n + 1$). This is necessary to provide access to the picture points of interest. Similarly an additional divide by four counter 97 is provided to give the remainder from the full store address (i.e. divider 96 provides the integer). This remainder (0-3) effectively defines the y address within the patch and this is passed to look up table 102 which is provided with 4 output lines corresponding to the row enables $R_0-R_3$ of FIG. 10. The LUT is arranged to enable not only the driver row designated by the remainder ($R_n$) but also the next row ($R_n+1$). Thus it is clear that this mechanism can be used to access the 4 picture points of interest within the patch in the way discussed in relation to FIG. 10 above. The dividers 95 and 97 will be updated at picture point rate so that five different combinations of 4 picture points can be selected for interpolation within the period before the next read operation of the RAMs. By including additional circuit blocks 98 and 99 it is possible also to determine the coefficient required for each of the multipliers of FIG. 11. As already explained the output of rotator block 92 can provide the x and y addressing to an accuracy of $\frac{1}{8}$. Any fractional part of the x and y address is used by the blocks 98 and 99 respectively and these blocks can be look up tables as shown so that if $FR_x$ is the fractional remainder received by block 98 then it produces two outputs of $FR_x$ and $(1-FR_x)$. Similarly with block 99 it will produce two outputs viz $FR_y$ and $(1-FR_y)$.

An example of a calculation process is shown in the chart of FIG. 14 with reference to FIG. 13.

The two x interpolation coefficients from block 98 and the two y interpolation coefficients from block 99 are used to perform the calculation of $N_A$, $N_B$, $N_C$ and $N_D$ in a similar manner to the example shown in FIG. 12. In practice this calculation can be performed by programmable read only memory 103 which uses the inputs to address internal locations which have been pre-programmed with the correct arithmetical result.

In practice the PROM will also require the output from dividers 95 and 97 to establish where the picture point on any of the 4 highways is relative to its geometric position. In other words looking at FIG. 10 it is clear that the output of driver 37D may be, under various circumstances, the bottom right hand picture point from the four RAMs 30, 31, 36 and 37 or the top right hand picture point from the four RAMs 36, 37, 42 and 43 or the bottom left hand picture point from the four RAMs 31, 32, 37 and 38 or the top left hand picture point from the four RAMs 37, 38, 43 and 44. This information is thus made available to the PROM 103 as shown. In other words the combination of inputs effectively define a particular address location with the PROM and the coefficient stored at that location is used as the input to the respective associated multiplier 81-84 of FIG. 11.

The system of FIG. 13 thus has the capability of defining the patch and selecting the desired picture points to be output for interpolation and the fractional parts of the addressing controlling the interpolator arithmetic multiplier weights. The addressing to the RAMs is updated every 5 picture points and the enabling of the drivers for the output latches are updated every picture point.

These techniques place the patch with an accuracy of 6 picture points horizontally and 4 lines vertically and the MOS RAM address is common to all the RAMs.

Clearly, it would be possible to place the patch with higher accuracy, if the address were not common to all RAMs but the physical realisation of such a scheme would be so difficult as to make this approach non-viable.

Figure 15:
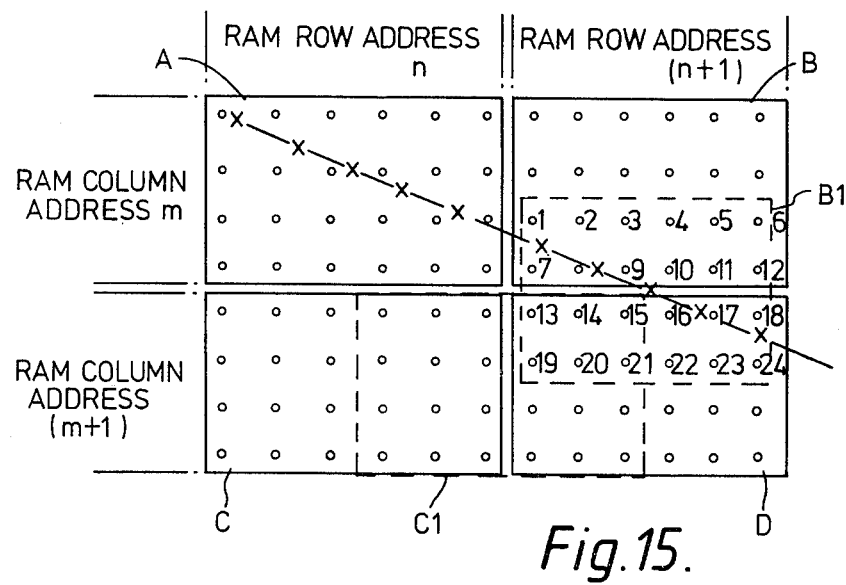
FIG. 15 illustrates the relative movement of patches within the picture.

A way for achieving such accuracy is now considered using FIG. 15 which shows some of the various patches for the picture. As already mentioned in connection with FIGS. 5 and 6, it is necessary to be able to synthesise five picture points from information contained within a single patch. Dependent on the angle of rotation selected, the diagonal line representing the synthesised line of information will not always be positioned such that it can use the patch information available to generate all 5 picture points, and thus would normally require two or three cycles of the RAM for the synthesis of the points, which is clearly not available. This is illustrated in this example by patch A being capable of providing from its 24 picture points all the information required to synthesise the desired 5 picture points but patch B only being of use to synthesise two picture points, the remaining 3 having to be obtained from patch D.

If however patch B could be offset downwards by 2 lines as represented by patch B1 then it is clear that this patch can be used to synthesise all 5 picture points without having to operate more than one read cycle of the RAM. Similarly patch C1 shows the possibility of moving the patch effectively to the right to provide any necessary offset.

FIG. 15 illustrates that it is possible in the present invention to achieve this offset by using the store configuration described but by incrementing by one the row and/or column addressing of the particular RAM to the right or below the normal boundary, the relevant 24 picture points can be found from a single read cycle.

Figure 16:
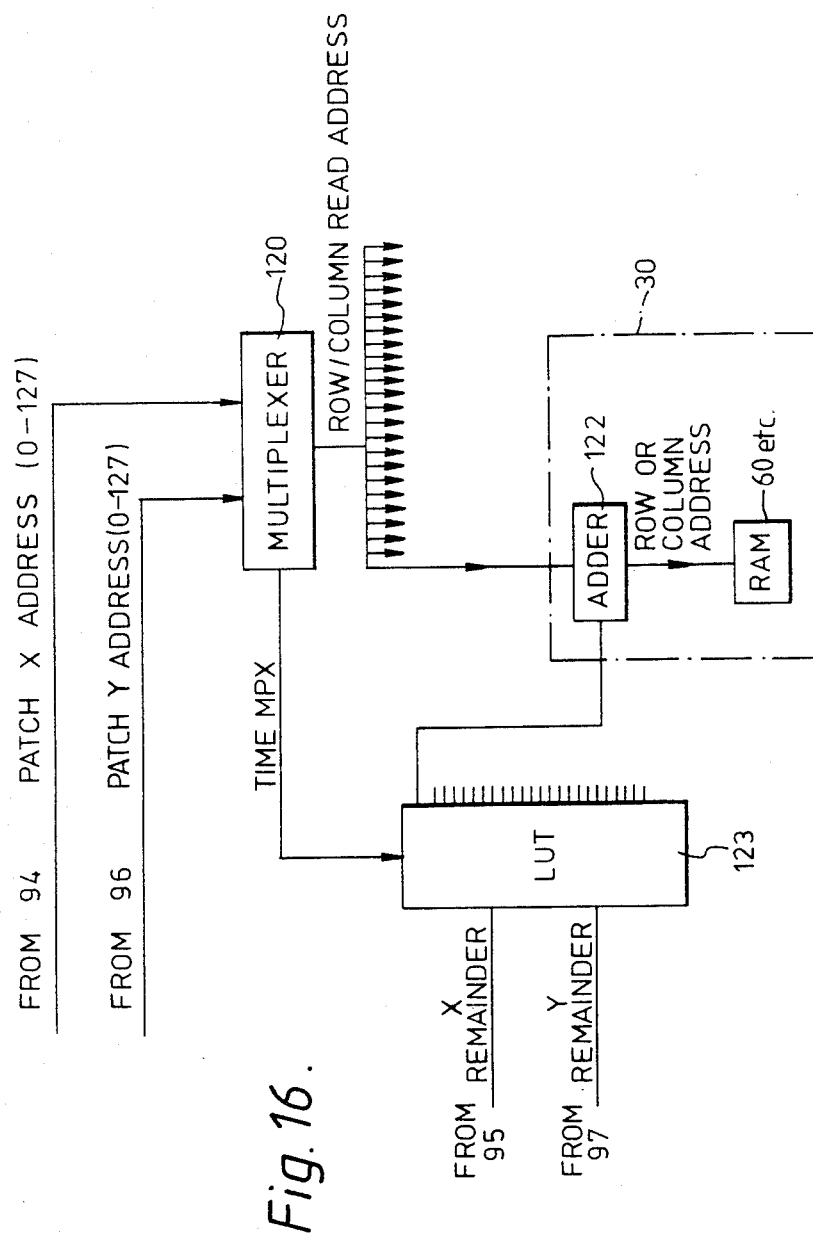
FIG. 16 shows a mechanism for achieving this modification.

Thus patch A can be considered to be located horizontally at address $n_x$ and vertically at address $m_y$ which address is provided by blocks 94 and 96 respectively of FIG. 13. In practice these two addresses are equivalent to the row and column address strobed within the RAM, and during a read cycle of the RAMs the single picture point from each of RAMs 30-53 will constitute the 24 picture points in the patch. With patch B it is apparent from its modified position (B1) that the first two lines of the patch are from address $m_y$ and the last two lines are from address $(m_y+1)$. Nevertheless there are still 24 picture points in this patch. To allow read access from the RAMs of picture points from the two addresses the system of FIG. 16 is used which under normal circumstances (without offset) will produce a patch x address and y address from blocks 94 and 96 of FIG. 13 respectively and these pass via the multiplexer 120 to provide the normal row and column addresses which are strobed into the RAM in the usual manner as described above and in the aforementioned patent. The row and column address will be the same for all 24 RAM blocks 30-53, although for simplification only one block 30 is shown. The row/column address passes to adder 122 which is controlled by the output from look up table 123. The LUT 123 is provided with 24 output lines one of each going to respective RAMs 30-53, and in practice each of the other RAMs 31-53 will have an adder associated with it. The output from LUT 123 will tell a particular adder (say adder 122) that it is required to add a nought or one to the RAM address (either row or column) received at that particular time and this can be simply achieved as a single output signal (high or low logic level). In this way individual addressing of each RAM is given without the necessity of actually addressing all the individual address lines as were thought initially to be necessary.

Whilst the system has been described generally as having one RAM block on each card the argument applies equally well to putting more than one block on each card as long as each has its associated address adder.

The LUT 123 receives its decision making information from the x address remainder from block 95 of FIG. 13, and the y address remainder from block 97 of that figure. Thus in the example shown where the patch was required to be in an identical position to its equivalent at the write side, at the start of the addressing calculation there would be no remainder from blocks 95 and 97, and no signal for adder 122 etc for that patch will be provided so no modification in the addressing is used. In the situation of B1 however at the start of the patch the divider block 95 would produce a remainder of zero and block 97 would produce a remainder of 2. The look up table 123 effectively produces the situation of adding 1 to the RAM addressing to any address in the row below the remainder (i.e. below 2 in this case) and adding a 1 to the RAM addressing to any address in the column below the remainder (in this case no remainder—so no addition). It is clear that such action will provide the 24 picture points desired.

Figure 17:
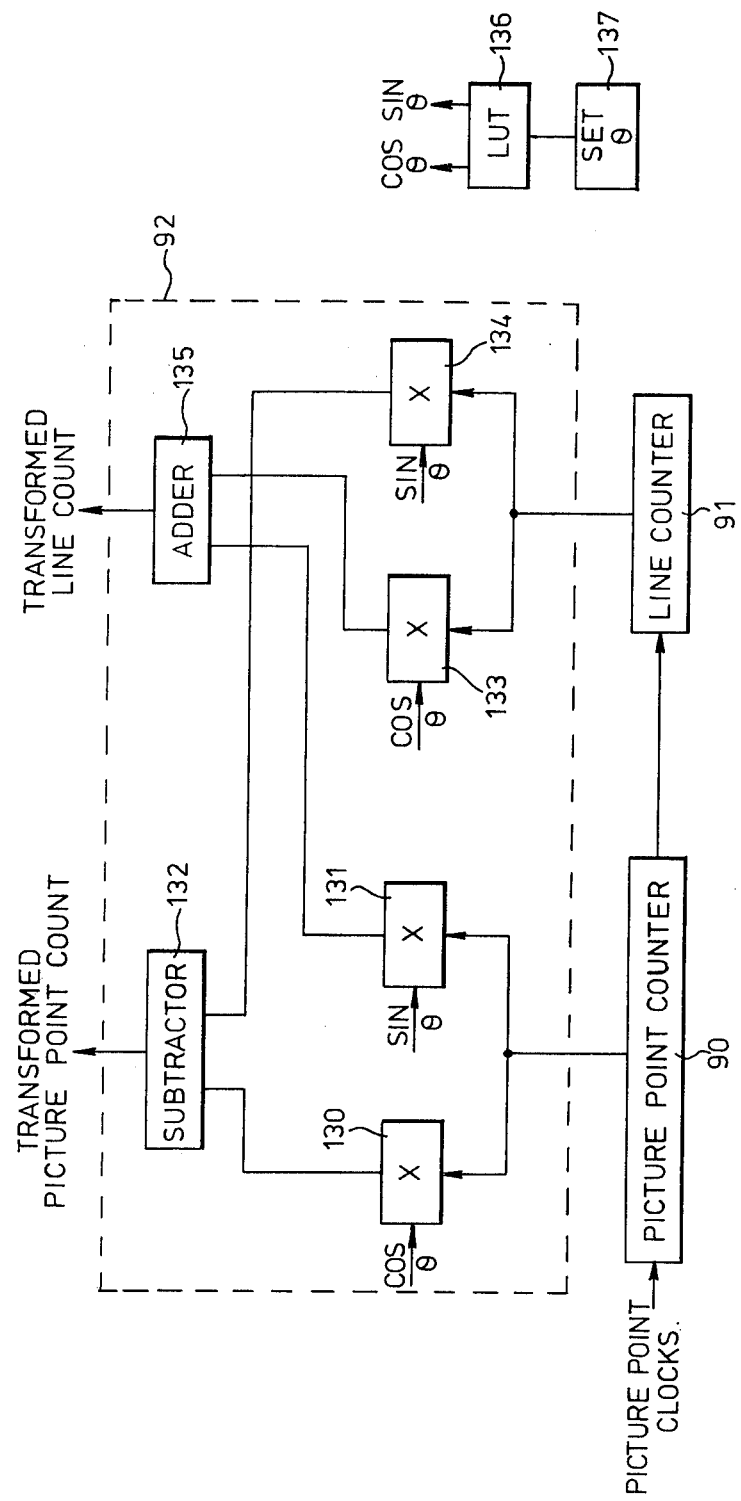

The rotator block 92 of FIG. 13 can be realised using the FIG. 17 arrangement which takes the outputs from picture point counter 90 which is passed to multipliers 130 and 131 which also respectively receive values of cos $\theta$ and sin $\theta$. These can conveniently be provided from look up table 136. The value of $\theta$ can be provided in the simplest case by known digital thumbwheel switches 137, or alternatively may use software especially if $\theta$ is being continually updated.

The output from line counter 91 is received by multipliers 133 and 134 which also respectively receive the cos $\theta$ and sin $\theta$ values. The picture point count multiplied by cos $\theta$ is subtracted in subtractor 132 from the line count multiplied by sin $\theta$. The picture point count multiplied by sin $\theta$ is added to the line count multiplied by cos $\theta$ in adder 135. The output from subtractor 132 provides the transformed picture point count and the adder output provides the transformed line count.

Figure 18:
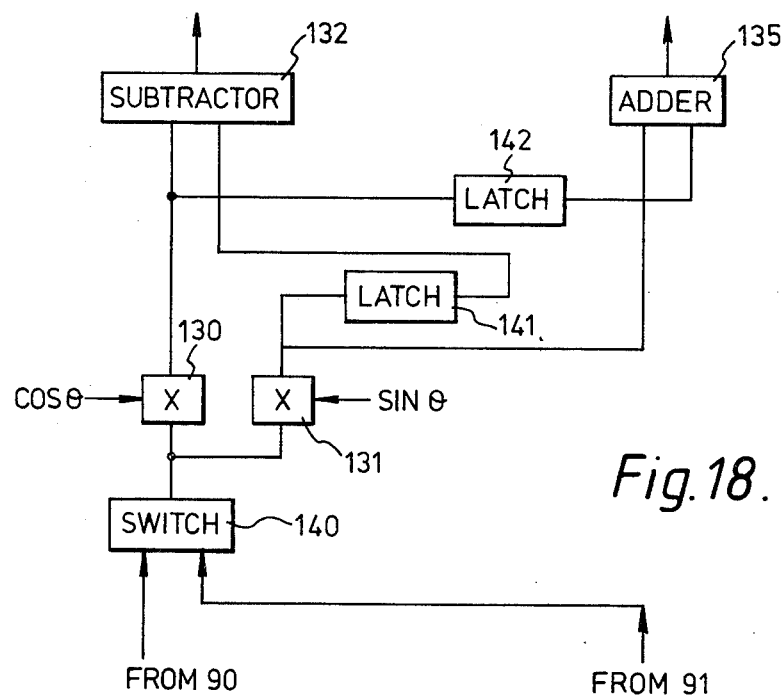
FIG. 17 shows an embodiment of the rotator block and FIG. 18 shows an alternative embodiment to FIG. 17.

In practice the number of multipliers can be reduced by using the FIG. 18 arrangement which incorporates switch 140 and latches 141 and 142. As the line count only changes once per line, the multiplication of the line count by cos $\theta$ and sin $\theta$ respectively can be carried out during line blanking by placing switch 140 in the appropriate position. This result is then held in latches 142 and 141 respectively for the entire line, and switch 140 is changed to pass the picture point count for multiplication incremented at picture point rate.

If the angle of rotation $\theta$ is chosen to remain constant after setting, then the computation will provide similar results frame by frame. If the angle is updated each frame the resultant picture appears to rotate or spin.

If the point of rotation is to be moved this can be achieved by modifying the picture point counts and line counts respectively.

The system described so far above is suitable for a monochrome system. In the colour situation, the above system can be used to deal with luminance information. A further two stores are required to handle the two colour difference channels respectively. However because of the reduced bandwidth requirements for the chrominance channels, patches of dimensions 2×2 picture points are all that is strictly necessary.

Although the system has been described in terms of basic picture rotation involving constant angular change throughout the picture, the machine is capable of many additional distortions or effects involving angular changes that vary line by line or even picture point by picture point and these are all intended to fall within the term "angular displacement". Thus only parts of the picture could be subjected to displacement in this way. The effects possible include rotary wipes, spirals and circular folds and for example can be augmented by inserting offset constants in the various stages of the address transform.

It is also possible to accomplish conventional changes in size, shape and position in the store mechanism and interpolate in a similar manner to that described in the aforementioned patents.

Although the system described has used single field interpolation, by including a further frame store it would be possible to provide a modified system using interpolation from both fields of the frame.

Although the description has been generally directed to a system incorporating dynamic RAMs, even in a system designed to incorporate static RAMs (which operate at a faster speed), the requirement for accessing an area of picture (e.g. 2×2 picture points) would be required if interpolation is to be effected. The area would have to be manipulated in a similar way to the above system to allow the window of picture points to be movable to select the desired 4 picture points used for interpolation at any one time.

We claim:

1. A processing system for processing input television signals to produce output television signals representing the same picture as the input signals but with an orientation change imparted to at least part of said picture, comprising:

storage means having relatively slow read rates for storing elements of said input television signals representing individual picture points;

address means for sequentially reading from said storage means successive batches of said input signal elements representing picture points included in respective two-dimensional areas of the picture, each said area of the picture having a horizontal dimension comprising a plurality of picture points and a vertical dimension comprising a plurality of lines of the input signal raster;

latch means having a relatively rapid read rate for temporarily storing each batch of selected signal elements;

processing means for reading signal elements from said latch means and for interpolating among said signal elements to synthesise at least one signal element for the output television signals from each batch of input signal elements; and means for producing said synthesised signal elements in the appropriate order in relation to the output signal raster to produce the desired change in the television picture.

2. A processing system according to claim 1, further comprising:

multiplexing means for writing the elements of said input television signals into said storage means in parallel sets such that a frame of said input signals can be written into the storage means in a frame period; and control means for reading each successive batch of input signal elements from said storage means into said latch means in one read cycle;

said processing means synthesising said output signal elements in response to successive batches of input signal elements at such a rate that output signal elements for the entire picture can be synthesised in a frame period.

3. A processing system according to claim 1, in which:
said address means is arranged to select successive batches of signal elements so that each represents an area having a horizontal dimension comprising more than two picture points and a vertical dimension comprising more than two lines of the same field; and
said processing means is arranged to synthesise a plurality of output signal elements from each batch of input signal elements.

4. A processing system according to claim 1, in which:
said address means include means for selecting, in succession, batches of input signal elements repesenting adjacent areas of the picture, said adjacent areas being offset horizontally or vertically in dependence upon a desired angle of displacement.

5. A processing system according to claim 4, in which:
said address means is arranged to select successive batches of input signal elements representing areas of the picture containing a line of the output signal raster; and
said processing means is arranged to syntehsise, in response to said batches of input signal elements, output signal elements representing successive picture points on said line.

6. A processing system according to claim 4, in which:
said storage means comprises a plurality of storage blocks, corresponding in number to the number of input signal elements in a batch and said input signal elements are written into said storage means so that a first address in said blocks stores a first batch of input signal elements, a second address in said blocks stores a second batch of input signal elements and so on, said batches corresponding to respective two-dimensional areas of the picture which are aligned horizontally and vertically with respect to each other; and
said address means is arranged to read signal elements from one or two addresses of said storage blocks to derive a batch of signal elements in dependence upon whether or not the respective adjacent areas of the picture are offset one with respect to the other.

7. A processing system according to claim 4, in which:
said processing means is arranged to synthesise from each batch of said input signal elements a plurality of output signal elements representing points on a line of the output signal raster, the offset of each respective area being such that the number of ponts on said line is the maximum, having regard to the dimensions of the area.

8. A processing system according to claim 1, wherein:
said processing means is arranged to read said latch means so as to output said signal elements at least four at a time; and said processing means is arranged to synthesise an output signal element by interpolation among the at least four signal elements outputed at one time.

9. A processing system according to claim 1, in which:
said address means is arranged to select batches of said input signals included in the same field of the input television signals, each batch of input signal elements representing picture points included in an area of the picture having a horizontal dimension comprising a plurality of picture points and a vertical dimension comprising a smaller plurality of lines in the same field of the input signal raster.

10. A processing system for processing input television signals to produce output television signals representing the same picture as the input signals with an orientation change imported to a least part of said picture, comprising:
storage means for storing elements of said input television signals representing individual picture points;
address means for sequentially selecting from said storage means successive batches of said input signal elements representing picture points included in respective two-dimensional areas of the picture, each said area of the picture having a horizontal dimension comprising a plurality of picture points and a vertical dimension comprising a plurality of lines of the input signal raster;
processing means responsive to said batches of input signal elements to synthesise at least one signal element for the output television signals from each batch;
said address means being arranged to select in sequence batches of input signal elements which represent areas of the picture which contain a line of the output signal raster; and
said processing means is arranged to synthesise the output signal elements representing successive picture points on said line, said output signal elements being rotated with respect to the input signal elements from which they are synthesised.

11. A processing system according to claim 10, in which:
said address means includes means for producing a signal representing a desired displacement angle for said at least part of the picture, and is arranged to select said batches of input signal elements in response to said displacement angle signal.

12. A processing system according to claim 11, in which:
said address means includes means for determining the address of one of said picture areas as a function of the address of a picture point on the output signal raster and of said displacement angle signal, the selection of the corresponding batch of input signal elements being carried out in response to said determination.

13. A processing system according to claim 10, in which:
said address means is arranged to select successive batches of signal elements so that each represents an area having a horizontal dimension comprising more than two picture points and a vertical dimension comprising more than two lines of the same field; and said processing means is arranged to synthesise a plurality of output signals from each batch of input signal elements.

14. A processing system according to claim 10, wherein,
said processing means is arranged to process the input signal elements of a batch four at a time to synthesise one output signal element from each four input signal elements by interpolation among said four input signal elements.

15. A processing system for processing input television signals to produce output television signals representing the same picture as the input signals but with an orientation change imparted to at least part of said picture, comprising:
means for setting up a displacement signal representing a desired displacement, including a component of rotation;
address means, responsive to said displacement signal, for deriving for each picture point on the output signal raster to be affected by said displacement, signals representing the two-dimensional address on the input signal raster of said picture point prior to displacement, said address signals being capable of representing one component of said address with the accuracy of a fraction of the separation between picture points on the lines of the respective raster and the other component of said address with an accuracy of a fraction of the separation between lines of the respective raster;
storage means for temporarily storing elements of said input television signals representing individual picture points, said address means including selecting means for selecting in response to the signals representing each two-dimensional address, a group of signal elements from said storage means, said selected signals representing picture points on said input signal raster around the respective address;
processing means for respectively weighting said selected signal elements and combining the weighted signal elements to produce a synthesised signal element for the selected address;
means for producing the synthesised signals in the correct order in relation to the output signal raster to produce the desired displacement in the television picture.

16. A processing system according to claim 15, in which:
said storage means comprises a first store having a relatively slow read rate for storing the separate elements of at least a field of said television signals, and latch means having a relatively rapid read rate having capacity for storing at least a group of said elements; and
said address means is arranged to transfer the selected groups of signals from said first store to said latch means, and to transfer said groups of signal elements from said latch means to said processing means.

17. A processing system according to claim 16, in which:
said latch means has capacity for storing a plurality of said groups of input signal elements (which groups may include common signal elements), and said address means is arranged to transfer a plurality of groups of said input signal elements from said first store to said latch means at one time and to transfer said groups in succession to said processing means.

18. A processing system according to claim 15, in which:
said processing means includes a look up table for storing weight coefficients for the selected signal elements, and means for selecting weight coefficient for a particular signal element in dependence upon the separation of the respective picture point and the respective two-dimensional address.

19. A method for processing input television signals to produce output television signals representing the same picture as the input signals but with an orientation change imparted to at least part of said picture, comprising:
storing elements of at least a field of said input television signals representing individual picture points;
sequentially reading successive batches of said stored input signal elements representing picture points included in respective two-dimensional areas of the picture, each said area of the picture having a horizontal dimension comprising a plurality of picture points and vertical dimension comprising a plurality of lines of the input signal raster;
temporarily storing each batch of selected signal elements;
reading said temporarily stored signal elements and interpolating among said signal elements to synthesise at least one signal element for the output television signals from each batch of input signal elements; and
producing said synthesised signal elements in the appropriate order in relation to the output signal raster to produce the desired change in the television picture.

20. A method according to claim 19, in which:
successive batches of signal elements each represent an area having a horizontal dimension comprising more than two picture points, and a vertical dimension comprising more than two lines of the same field; and
a plurality of output signal elements is synthesised from each batch of input signal elements.

21. A method for processing input television signals to produce output television signals representing the same picture as the input signals with an orientation change imparted to a least part of said picture, comprising:
storing elements of at least a field of said input television signals representing individual picture points;
sequentially selecting from said storage means successive batches of said input signal elements representing picture points included in respective two-dimensional areas of the picture, each said area of the picture having a horizontal dimension comprising a plurality of picture points and a vertical dimension comprising a plurality of lines of the input signal raster;
synthesising at least one signal element for the output television signals from each batch of input signal elements;
the successive batches selected from said storage means representing areas of the picture which contain a line of the output signal raster; and
the output signal elements being synthesised in such order as to represent successive picture points on said line, said output signal elements being rotated with respect to the output signal elements from which they are synthesised.

22. A method according to claim 21, whereas:
the input signal elements are selected from a batch four at a time, and one output signal element is synthesised from each four input signal elements by interpolation among said four input signal elements.

23. A method for processing input television signals to produce output television signals representing the same picture as the input signals but with an orientation change imparted to at least part of said picture, comprising:

setting up a displacement signal representing a desired displacement, including a component of rotation;

using said displacement signal for deriving for each picture point on the output signal raster to be affected by said displacement, signals representing the two-dimensional address on the input signal raster of said picture point prior to displacement, said address signals being capable of representing one component of said address with the accuracy of a fraction of the separation between picture points on the lines of the respective raster and the other component of said address with an accuracy of a fraction of the separation between lines of the respective raster;

temporarily storing elements of said input television signals representing individual picture points;

selecting in response to the signals representing each two-dimensional address, a group of the stored signals element, said selected signals representing picture points on said input signal raster around the respective address;

respectively weighting said selected signal elements and combining the weighted signal elements to produce a synthesised signal element for the selected address;

producing the synthesised signals in the correct order in relation to the output signal raster to produce the desired displacement in the television picture.

* * * * *